United States Patent

Keznickl

[15] 3,640,441
[45] Feb. 8, 1972

[54] INTERMITTENT DRIVE MECHANISM FOR CINEMATOGRAPHIC APPARATUS
[72] Inventor: Eduard Keznickl, Vienna, Australia
[73] Assignees: Karl Vockenhuber; Raimund Hauser, Vienna, Austria
[22] Filed: Oct. 21, 1969
[21] Appl. No.: 868,073

[30] Foreign Application Priority Data
Oct. 23, 1968 Austria .......................... A 10358/68

[52] U.S. Cl. ............................... 226/49, 226/62, 352/195
[51] Int. Cl. ............................................................. G03b 1/22
[58] Field of Search ................ 226/49, 50, 62; 352/194, 195, 352/196

[56] References Cited

UNITED STATES PATENTS 3,463,372  8/1969  Kirn ................................. 226/49
3,463,373  8/1969  Johnson ........................... 226/49

FOREIGN PATENTS OR APPLICATIONS 1,309,503  11/1961  France ............................ 352/195

Primary Examiner—Richard A. Schacher
Attorney—Ernest G. Montague

[57] ABSTRACT

An intermittent drive means for a cinematographic apparatus which is adapted to be used with perforated film. The intermittent drive means includes claw means adapted to engage and disengage the perforation holes of the film and to transport the same. A pair of cam means is rotatable about an axis in a single direction and has first and second cam surfaces. First and second cam follower means are connected with the claw means, and the first cam surfaces are adapted to impart forward film transporting motion to the claw means. The second cam surfaces are adapted to move the claw means periodically in perforation engaging and disengaging position. Third cam means are coaxial to the cam means having first cam surfaces. The third cam means are adapted to impart reverse film transporting motion to the claw means and have third cam surfaces symmetrically to the first cam surfaces with respect to a fictive surface being coaxial to the cam means. Transporting direction changing means are connected with the first cam follower means and are adapted to control the same for alternative cooperation with the first and the third cam surfaces, respectively.

10 Claims, 4 Drawing Figures

PATENTED FEB 8 1972

3,640,441

INTERMITTENT DRIVE MECHANISM FOR CINEMATOGRAPHIC APPARATUS

The invention relates to an intermittent drive mechanism for cinematographic apparatus, in particular for projectors, with a single claw movable parallelly to the direction of the film course, the movement of which is controllable by means of a transport cam and a transverse cam along the direction of the film course and at right angles to the film plane respectively, whereby for reversing the transport direction with synonymously rotating cams, the claw can be changed over by a first pair of cams consisting in the transport cam and the transverse cam, to a second similar pair of cams.

In a known intermittent drive of the kind described above, the transport cam is pivoted on the claw shaft and is driven by said shaft by means of two alternately operating catches. The two catches are staggered by 180°, so that depending on the engagement of one or the other catch, the transport cam takes two positions staggered by 180° with respect to the claw shaft, while the transverse cam is rigidly coupled with the claw shaft. According to the position of the transport cam on the claw shaft, the claw transports the film, with the same sense of rotation of the shaft, in forward and reverse direction. A disadvantage of this construction is that the transport cam must be symmetrical and therefore relatively high torque peaks in use are inavoidable. A further disadvantage consists in the loose bearing of the transport cam on the claw shaft, whereby the formation of noises and an unsatisfactory steadiness of the image occur. It has also been suggested, to connect the transport cam rigidly with the claw shaft and to provide two transverse cams staggered reciprocally, whereby upon use of the first transverse cam, the claw engages the film perforation in its downward movement, while upon use of the second transverse cam, the claw drives the film in its upward movement. In the first case the film is transported in forward direction, in the second case in reverse direction. Also in this arrangement it is not possible to attain an optimum effect of the transport cam.

According to the invention the disadvantages of the known solutions are avoided in that there are provided two transport cams, which show a course of curve, which is in phase with respect to the transverse cam and symmetrical with respect to a cylindric surface standing coaxially to the cam shaft, whereby if desired the two pairs of cams are staggered reciprocally with respect to their angle position.

According to an advantageous embodiment of the invention, the two transport cams are radial cams, whereby one cam is developed as outer cam, the other one as inner cam surrounding the cam follower or followers, respectively, arranged on the claw, which joins or join, respectively, to one or the other cam under the force of a spring. In another advanced embodiment of the invention the average radius of the two cams are chosen thus, that the difference between the height of the claw tooth and the perforation hole is compensated and the claw transports the film thus, that the perforation holes always take the same position with respect to the film gate, independent of the transport direction of the film. By this measure the defect in image steadiness is compensated, which normally occurs with other intermittent drives upon reversing the transport direction.

An especially favorable course of the drive torque of the intermittent drive may be attained by providing one or more springs, which may be changed over in their positive direction and which join the cam follower arranged on the claw to one or the other cam, whereby the spring is loaded relatively slowly by the cam, when the claw is not in mesh with the film perforation, and it is relaxed within an extremely short phase, when the claw engages the film perforation. As there is provided a special transport cam for each film transport direction of the claw, both of the cams reach an optimum in their effect.

In a further embodiment of the invention, the cam follower is displaceable to an intermediate position, in which it is removed from the two transport cams. In this position of the claw consequently no film is transported, so that a stillstanding image may be projected. A special advantage of this measure is that with the cam follower in intermediate position, the torque requirement of the intermittent drive is extremely low. It is therefore advisable to displace the claw in this intermediate position for quick rewind of the film, for which a greatest possible drive power for the reel drive is required. When the film is rewound through the film stage, it is useful to provide a coaxial orbit between the two transverse cams, which lies in the normal plane of the axis of rotation and, with the cam follower abutting said orbit, retains the claw in a retracted position during the whole revolution of the cam. Therewith arrangements may be eliminated, which are provided in other known apparatus to guarantee that the claw does not come into contact with the film during rewinding with high velocity.

Further features of the invention will become apparent in the following specification of an embodiment and with reference to the drawing.

In FIG. 1 an intermittent drive of a substandard format film projector is illustrated in front elevation.

FIG. 2 displays a section along the plane II—II of FIG. 1.

Figure 1:
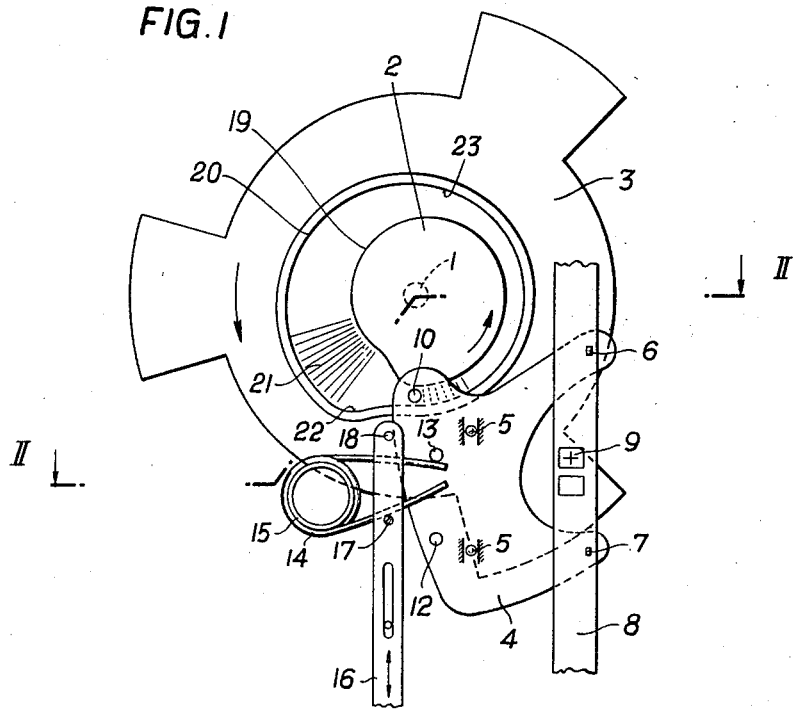
Figure 2:
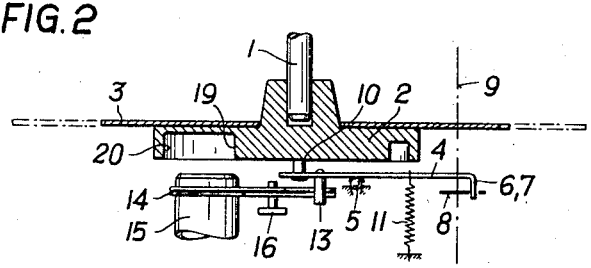

On the shaft 1 there is arranged a cam disk 2, which bears a three-bladed rotating shutter 3. A claw frame 4 is situated opposite the cam disk 2, which is shiftably and pivotally arranged in vertical direction in two spherical guides 5. The claw frame 4 bears two claw teeth 6, 7, which engage the perforation holes of the film 8 and transport the same step by step, whereby the film is projected on a screen (not shown) by means of an illuminating and reproducing system (not shown). The optical axis of the illuminating and reproducing system is marked in the drawing by the number 9. To the claw frame 4 there is fastened a cam follower 10, which is urged in axial direction to the cam disk 2 under the force of a spring 11. The claw frame further bears two bolts 12, 13 cooperating with a leg spring 14, which loops a pin 15. By a vertically shiftable slider 16, which bears pins 17 and 18, the leg spring 14 can be joined to the bolts 12 and 13 of the claw frame. According to the positive direction of the leg spring 14, the cam follower 10 is urged either to the outer cam 19 or to the inner cam 20 of the cam disk. The surface area of the notch of the cam disk 2 surrounded by the cams 19 and 20, is constructed as transverse cam 21 and deviates the claw frame round the spherical guides 5, whereby the claw teeth 6 and 7 are withdrawn from the perforation holes of the film, or they engage them, respectively.

The mode of operation of the novel arrangement is set forth in the following, whereby it is started from the position of the intermittent drive displayed in FIG. 1. The cam follower 10 of the claw frame has been deviated forwardly by means of the transverse cam 21 and therewith has put the claw teeth 6 and 7 in the perforation holes. Upon further rotation of the cam disk 2 and of the rotating shutter 3 in counterclockwise sense, the cam follower 10 reaches the steep portion of the cam 19 and is deviated upwards by means of a spring 14, whereby simultaneously the claw teeth 6 and 7 transport the film 8 upwards. The cam follower 10 reaches in the following a curve portion with constant radius, so that the transport movement of the claw frame is terminated. Simultaneously the claw frame is deviated by the transverse cam, whereby the claw teeth 6 and 7 are withdrawn from the perforation holes. By the joining curve portion 23 with little slope, the claw is replaced to its initial position. When the slider 16 is shifted downwards, the leg spring 14 is joined to the bolt 12 of the claw frame by means of the pin 18 and deviates the bolt downwards, whereby the cam follower 10 props to the inner cam 20 of the cam disk 2. Since by this displacement of the claw during the phase in which the claw teeth 6, 7 engage the film perforation, the claw frame is displaced downwards, the filmstrip 8 is transported downwards, that is in forward direction. The replacement of the claw frame is likewise effected by a cure portion of little slope, so that the maximum drive torque of the intermittent drive remains relatively small. When the slider 16 is deviated to an intermediate position, in which both ends of the leg spring 14 abut the bolts 12 and 13, the claw frame 4 is also displaced to an intermediate position, in which the cam follower 10 is removed from either of the transport cams 19 and 20. The claw frame therefore shows no up and down movement during one revolution of the cam, but only a rotating motion round the spherical guide 5. As a consequence the claw teeth 6, 7 engage the perforation holes of the filmstrip 8 periodically, but no transport of the film takes place. When in this position of the slider 16 the illuminating system is switched on, a stillstanding image is projected.

Figure 3:
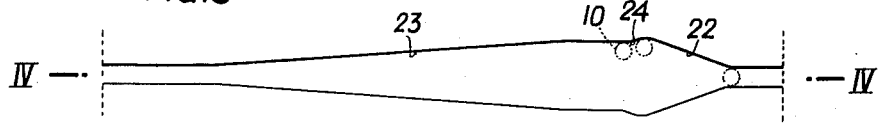
FIG. 3 shows the two transport cams with unrolled line of symmetry in magnification.
Figure 4:
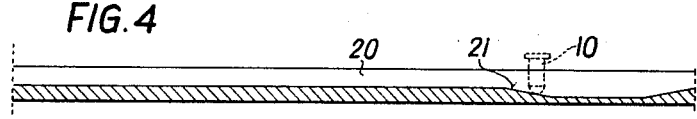
FIG. 4 is a section along the plane IV—IV of FIG. 3.

FIGS. 3 and 4 illustrate the course of the transport cams and of the transverse cams in particular. To the curve portion 22, which is very steep in consideration of the high transporting velocity of the claw, there is joined a curve portion with constant radius. In order to avoid an uncontrolled displacement of the filmstrip 8 upon withdrawal of the claw teeth 6, 7, the claw teeth are removed from the edge of the perforation before the start of the transverse movement. The corresponding curve portion of the cam is marked in the drawing by the number 24.

The invention is not limited to the illustrated embodiment. As already set forth above, it may be advantageous to provide an average course for the cam follower 10 being plane and normal to the rotation axis, so that upon displacement of the cam follower to the intermediate position, a transverse movement of the claw does not take place. It will be useful to determine this course thus, that the claw teeth are withdrawn in this position from the film perforation. Instead of the construction of the transport cams as inner and outer cams, as illustrated in the drawing, it is also possible of course to design both of the cams as outer cams. In this case it will be useful to provide a cylindric curve portion between the two cams and to displace the cam follower 10 in axial direction. Within the scope of the invention it is also possible to arrange the transport cams and the transverse cams on separate shafts connected with suitable gears. It is also obvious to stagger the transport cams reciprocally. Using intermittent drive mechanisms with a three-bladed shutter, as illustrated in the drawing, the transport cams may be staggered reciprocally by 120° or 240°, respectively, with intermittent drive mechanisms with a two-bladed shutter correspondingly by 180°.

What is claimed is:

1. Intermittent drive means for a cinematographic apparatus adapted to be used with perforated film, said intermittent drive means including claw means adapted to engage and disengage the perforation holes of said film and to transport the same, a pair of cam means rotatable about an axis in a single direction and having first and second cam surfaces, first and second cam follower means connected with said claw means, said first cam surfaces being adapted to impart forward film transporting motion to said claw means, said second cam surfaces being adapted to move said claw means periodically in perforation engaging and disengaging position, third cam means being coaxial to the cam means having first cam surfaces, said third cam means being adapted to impart reverse film transporting motion to said claw means and having third cam surfaces symmetrically to said first cam surfaces with respect to a fictive surface being coaxial to and between said cam means, transporting direction changing means connected with said first cam follower means and adapted to control the same for alternative cooperation with said first and said third cam surfaces, respectively.

2. Intermittent drive means according to claim 1, further comprising fourth cam means being coaxial to said cam means having second cam surfaces, said fourth cam means having fourth cam surfaces being identical to said second cam surfaces, said transporting direction changing means being also connected with said second cam follower means and adapted to control the same for alternative cooperation with said second and fourth cam surfaces, respectively, said first and second cam surfaces being relative to said third and fourth cam surfaces in staggered relation with respect to their angular position.

3. Intermittent drive means for a cinematographic apparatus adapted to be used with perforated film, said intermittent drive means including claw means adapted to engage and disengage the perforation holes of said film and to transport the same, first cam means rotatable about an axis in a single direction and having first cam surfaces, said first cam surfaces being adapted to impart forward film transporting motion to said claw means, second cam means coaxial to said first cam means and having second cam surfaces, said second cam surfaces being symmetrical mirror imagelike to said first cam surfaces with respect to a fictive surface being coaxial to and between said cam means, said second cam surfaces further being adapted to impart reverse film transporting motion to said claw means, cam follower means connected with said claw means, biasing means adapted to urge said cam follower means into engagement with one of said first and second cam surfaces, transporting direction changing means connected with said biasing means to alter the direction of urging forces thereof exerted to said cam follower means, said cam follower means being located between the planes of said first and second cam surfaces.

4. Intermittent drive means according to claim 3 wherein each of said first and second cam surfaces have different radial distances from said axis, one of said cam means being outer cam means, the other cam means being inner cam means.

5. Intermittent drive means according to claim 3, wherein said claw means have at least one claw tooth and the average distance between said first and second cam surfaces is chosen thus, that the difference between the height of said claw tooth measured in transporting direction of said film and the height of said perforation holes is compensated, whereby the position of said perforation holes relative to said film gate means independent of the direction of transporting motion of the film is always the same.

6. Intermittent drive means according to claim 3, wherein said biasing means comprise spring means, in perforation disengaging position of said claw means said spring means being loaded relatively slowly, in perforation engaging position of said claw means said spring means being relaxed within an extremely short phase.

7. Intermittent drive means for a cinematographic apparatus adapted to be used with perforated film, said intermittent drive means including claw means adapted to engage and disengage the perforation holes of said film and to transport the same, cam means rotatable around an axis in a single direction and having notch means, said notch means comprising first transport cam surfaces being adapted to impart forward film transporting motion to said claw means, second transport cam surfaces being symmetrical to said first cam surfaces with respect to a fictive surface being coaxial to and between said cam means, said second cam surfaces further being adapted to impart reverse film transporting motion to said claw means, transverse cam surfaces located between said first and second cam surfaces and being adapted to move said claw means periodically in perforation engaging and disengaging position, cam follower means adapted to cooperate alternatively with one of said transport cam surfaces and being connected with said claw means, biasing means adapted to urge said cam follower means alternatively into engagement with one of said transport cam surfaces, transporting direction changing means connected with said biasing means to alter the direction of urging forces thereof exerted to said cam follower means, said cam follower means being located between the planes of said first and second cam surfaces.

8. Intermittent drive means for a cinematographic apparatus adapted to be used with perforated film, said intermittent drive means including claw means adapted to engage and disengage the perforation holes of said film and to transport the same, first cam means rotatable about an axis in a single direction and having first cam surfaces, said first cam surfaces being adapted to impart forward film transporting motion to said claw means, second cam means coaxial to said first cam means and having second cam surfaces, said second cam surfaces being symmetrical to said first cam surfaces with respect to a fictive surface being coaxial to and between said cam means, said second cam surfaces further being adapted to impart reverse film transporting motion to said claw means, cam follower means connected with said claw means, biasing means adapted to urge said cam follower means into engagement with one of said first and second cam surfaces, transporting direction changing means connected with said biasing means to alter the direction of urging forces thereof exerted to said cam follower means, said cam follower means being located between the planes of said first and second cam surfaces and having a first operating position, wherein said cam follower means cooperate with said first cam surfaces, a second operating position, wherein said cam follower means cooperate with said second cam surfaces and an intermediate position wherein said cam follower means are removed from either of said first and second cam surfaces.

9. Intermittent drive means according to claim 8, wherein said transporting direction changing means have a first position corresponding to forward film transporting motion, a second position corresponding to reverse film transporting motion and a third position corresponding a standing still position of the film, in said third position the urging forces of said biasing means towards said first and second cam surfaces being neutralized and said cam follower means being in intermediate position.

10. Intermittent drive means according to claim 8, further comprising transverse cam means, having first control surfaces extending inwardly and outwardly to move said claw means periodically into perforation engaging and disengaging position and second control surfaces adapted to disengage said claw means for said perforation holes, in intermediate position of said cam follower means said claw means being controlled by said second control surfaces.

* * * * *